Figure 5:
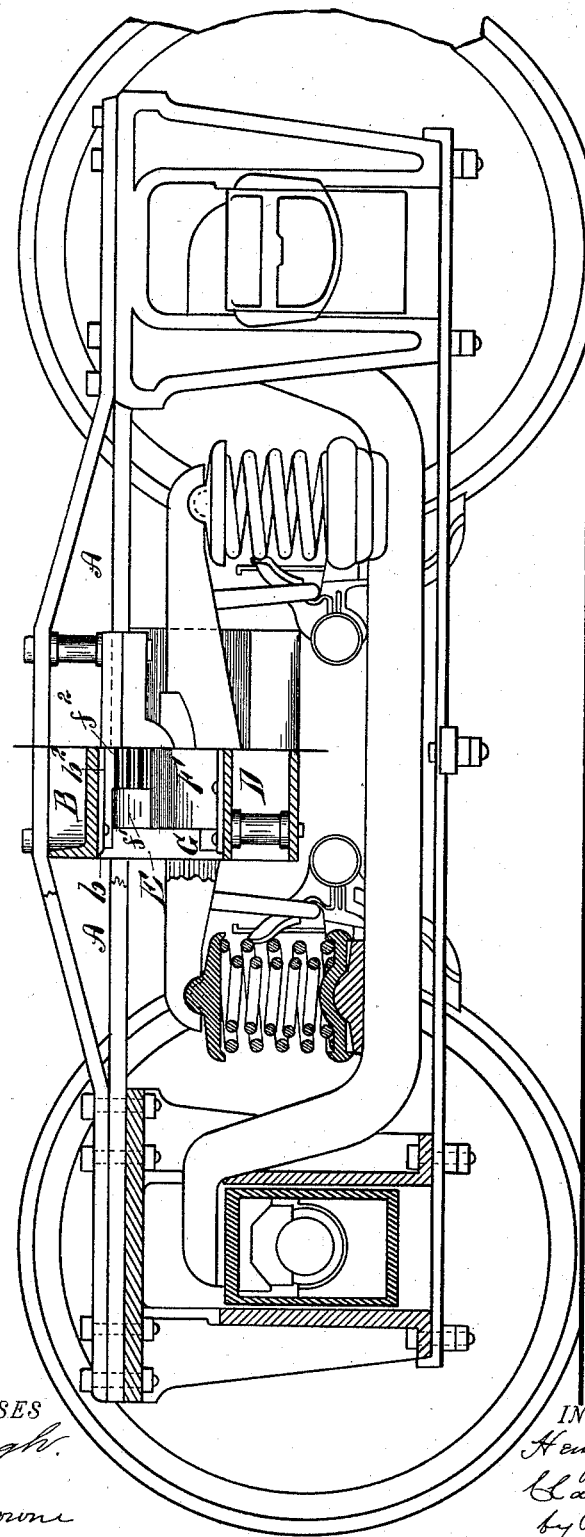

(No Model.)  H. C. & C. B. HODGES.  3 Sheets—Sheet 1.
CAR TRUCK.
No. 477,657.  Patented June 28, 1892.
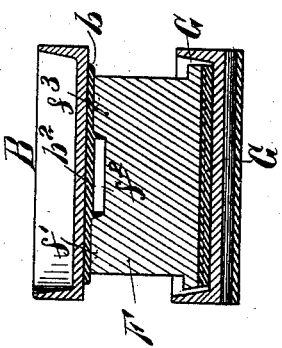
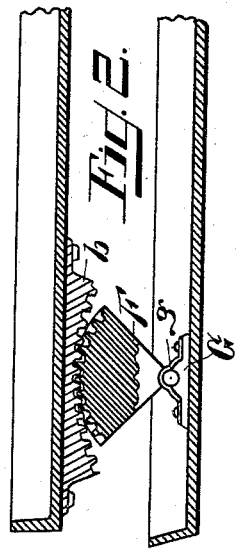
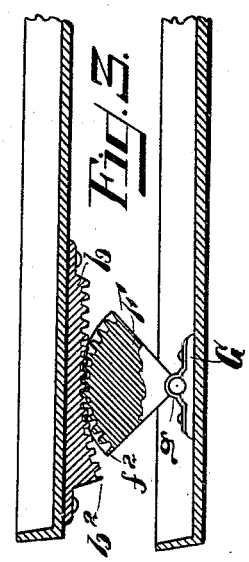
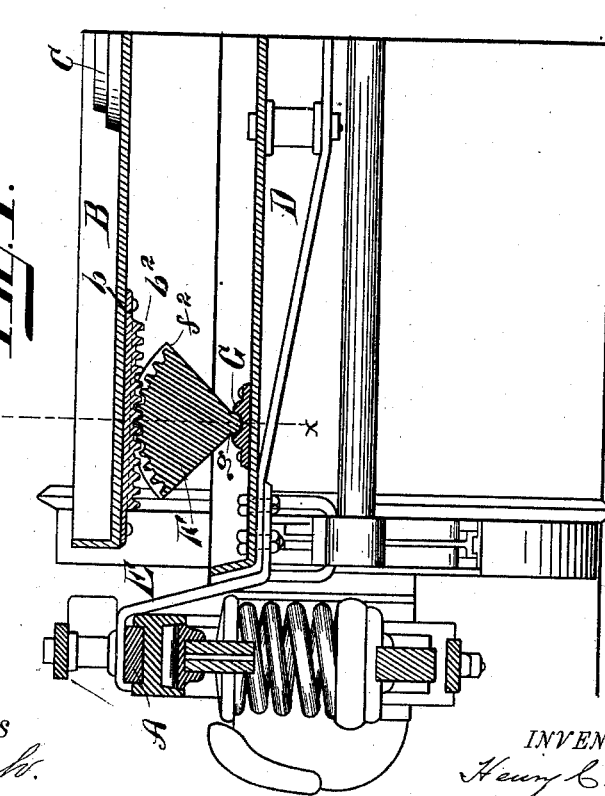
WITNESSES
INVENTORS:
Henry C. Hodges
Clarence B. Hodges
by Parker & Burton
Attorneys.

(No Model.) 3 Sheets—Sheet 2.

H. C. & C. B. HODGES.
CAR TRUCK.

No. 477,657. Patented June 28, 1892.

WITNESSES
F. Clough.
Dell J. Brown.

INVENTORS:
Henry C. Hodges
Clarence B. Hodges
by Parker & Burton
Attorneys.

THE NORRIS PETERS CO., PHOTO-LITHO., WASHINGTON, D. C.

(No Model.) 3 Sheets—Sheet 3.

H. C. & C. B. HODGES.
CAR TRUCK.

No. 477,657. Patented June 28, 1892.

WITNESSES
F. Clough.
Dell J. Browne

INVENTORS:
Henry C. Hodges
Clarence B. Hodges
by Parker & Burton
Attorneys.

UNITED STATES PATENT OFFICE.

HENRY C. HODGES AND CLARENCE B. HODGES, OF DETROIT, MICHIGAN.

CAR-TRUCK.

SPECIFICATION forming part of Letters Patent No. 477,657, dated June 28, 1892.

Application filed March 9, 1892. Serial No. 424,336. (No model.)

*To all whom it may concern:*

Be it known that we, HENRY C. HODGES and CLARENCE B. HODGES, citizens of the United States, residing at Detroit, county of Wayne, State of Michigan, have invented a certain new and useful Improvement in Car-Trucks; and we declare the following to be a full, clear, and exact description of the invention, such as will enable others skilled in the art to which it pertains to make and use the same, reference being had to the accompanying drawings, which form part of this specification.

Our invention relates to car-trucks or other vehicles, and is especially designed as an improved means of permitting lateral movement of the truck relatively to the car or other bodies, and is especially applicable to the center truck in three-truck cars; and it consists in an improved means of permitting such lateral movement, and in the combination of the various parts, as hereinafter described.

In the drawings the same letters refer to similar parts.

Figure 6:
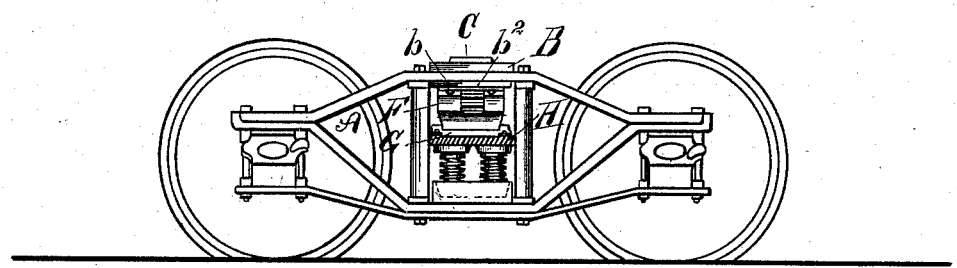
Figure 7:
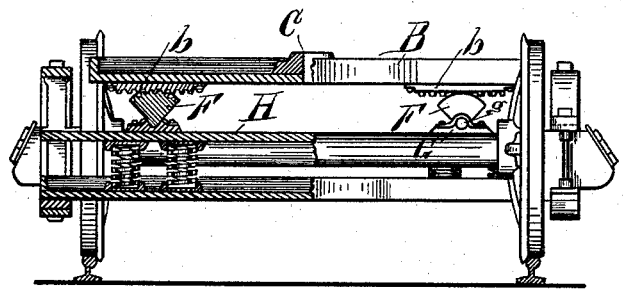

Figure 1 is a perpendicular cross-center sectional view of one-half of a four-wheeled truck employing our invention. Figs. 2 and 3 illustrate modifications of the invention, for purposes hereinafter stated. Fig. 4 is a perpendicular longitudinal sectional view of the sector-block which we employ and its bearings, on the line $x\ x$ of Fig. 1. Fig. 5 is a side view of an equalizing truck employing our invention, with the central portion broken away to show its relation in combination with the various portions of the truck. Fig. 6 is a side view of an ordinary diamond truck, showing the sector-block and parts in position. Fig. 7 is a perpendicular central cross-sectional view of one-half of Fig. 6, more fully illustrating the application of the invention to that class of trucks.

In the various figures, A represents the wheel-pieces of the truck-frame, carrying the ordinary pedestals and bearings for the wheels, which in themselves are not new and need no further description. The frames may be of the ordinary diamond types, as in Fig. 6, or they may be constructed with equalizing devices, as in Fig. 5, or of other types.

In the drawings, B represents the bolster, which carries the truck center plate and king-pin, (shown at C.)

In Figs. 1 and 5, D is a truss transversely located in the center of the truck and rigidly attached to the frame A by hangers E.

F is a sector-block trunnioned in bearings $g$, located in the bearing-block G, attached to and upon the truss D in Figs. 1 and 5, and upon an upper spring-plank H in Figs. 6 and 7. The sector-block F is peculiarly constructed. It consists in a section of about one-quarter of a cylinder, although it may be varied somewhat in that particular. It is preferably cast solid, having upon its axial portion projections or trunnions by which it may be secured in bearings. The bearing portion, however, may extend throughout the whole length of the axial portion, the lower edge so formed being somewhat rounded and resting in an appropriate seat $g$ upon a bearing G, securely attached to the truss D. The periphery of the sector-block F is preferably circumferentially divided into three sections, as shown in cross-section in Fig. 4 at $f'\ f^2\ f^3$. The central section is cast with cog-teeth, as shown in Figs. 1, 2, 5, and 7. The other two sections $f'$ and $f^3$ have a smooth periphery, the radius of which is equal to that of the points of the teeth in $f^2$. It will be seen by this description that the teeth in the section of the sector-block F are sunk into the peripherical surface instead of standing out therefrom. Underneath the bolster B there are face-plates $b$ arranged, containing on either side thereof two smooth surfaces fitted to receive and on which may roll to a certain extent the peripherical surfaces of the sector-block $f'$ and $f^3$. In the central portion of $b$ at $b^2$ are cast teeth raised upon the surface of $b$ and fitted thereby to engage in the sunk teeth $f^2$ of the sector-block F. This construction is the same as shown in Figs. 1 and 7. Under the opposite end of the bolster B and at equivalent distances from its end is located a similar sector-block, with its appropriate bearings upon the truss D and face-plates under the bolster B. It will be seen that by means of such construction the bolster B can be moved transversely relative to the truck to any extent within the range of the truck-frame or any adjustable range that may be desired less than the extreme, and that such mode of operation is the same, whether the invention be applied to a truck of the form as shown in Figs. 1 and 5 or in a diamond truck like Fig. 6, it being equally adapted to any other form of truck or vehicle. It is obvious that the arrangement of toothed and smooth surfaces may be varied without departing from our invention.

Figs. 2 and 3 show slight modifications, which may be applied, if desired. In Fig. 2 the face-plate b, attached to the bolster B, has its contact-surface with the sector-block F curved with a radius distinctly greater than the radius of the sector-block. By this means the transverse motion of the bolster B would raise it to an extent proportionate to the transverse motion combined with the curvature of the face-plate b, and thus raise the body of a car resting upon the bolster. In consequence of the curvature the tendency of the weight of the car will be to compel a return of the bolster B to a central position, as shown in Figs. 2 and 3.

We are aware that in analogous forms of construction rollers have been employed in the place of the sector-block F and placed between a bolster and a bearing so as to permit that longitudinal movement of the bolster; but with them there are certain difficulties, the principle one of which is that the limited motion together with the confinement of the bearing to that motion soon wears the rollers, thus making them untrue. This wear continued very readily brings them to a point where the rollers cease to act as such, thus becoming nothing more than mere friction-plates, which create excessive grinding and strain under the heavy weights they must carry. It is also difficult to retain the rollers in place, as, by virtue of their rotating at both the upper and lower sides, they must be held by central bearings of some kind, or else they are liable to be displaced. This renders an apparatus of that character quite complicated and liable to derangement, all of which is obviated by the employment of the sector-block held in position by the trunnion-bearings and the rack-and-pinion movement in connection with the bolster.

Having thus described our invention, what we desire to secure by Letters Patent is—

1. In a car-truck, the combination of a supporting-truss, a bolster movable laterally with reference to said truck, and a rolling support between said truss and bolster, the said rolling support being provided with a smooth bearing-surface adapted to engage with and roll upon a smooth plate on the bolster, and being also provided with a toothed part sunk beneath the smooth surface of the bearing part and adapted to engage with raised teeth upon the said plate, substantially as and for the purpose described.

2. In a car-truck, the combination of a supporting-truss, a bolster adapted to move laterally with reference to said truck, a rolling support between said parts having a smooth bearing-surface, and a toothed holding-surface having the radius of the extreme outer edge of the teeth the same as the radius of said smooth bearing-surface and being adapted to engage with the teeth of a rack secured to said transverse member, whereby the weight to be supported is carried on said smooth surfaces, but side slip is prevented by the engagement of the toothed parts, substantially as and for the purpose described.

3. In a car-truck, the combination of a supporting-truss, a supporting-bar transverse the truck, a bolster movable laterally with reference to said truck, and a rolling support interposed between said bolster and said transverse bar in the form of a quadrant provided with central bearing-supports and adapted to rotate on such central support, provided, also, with a smooth outer bearing-surface and with sunken teeth in its periphery, adapted to engage with a corresponding smooth bearing-surface and with raised teeth on a rack secured to said bolster, substantially as and for the purpose described.

4. In a car-truck, the combination of a transverse member secured to the truck, a laterally-movable bolster secured to the car-body, a rolling support made in the form of a quadrant, a bearing secured to the transverse member, adapted to receive the axial part of the quadrant, and a smooth bearing secured to said bolster, adapted to engage with the periphery of said quadrant-block, substantially as and for the purpose described.

5. In a car-truck, the combination of a transverse supporting member, a bolster, a centrally-supported sector-block, and a bearing-plate upon said bolster having both a toothed surface and a smooth surface adapted to engage with corresponding toothed and smooth surfaces on the periphery of said sector-block, the said bearing-block being concavely curved with a radius greater than the sector-block, substantially as and for the purpose described.

6. In a car-truck, the combination, with a supporting member laterally rigid with reference to said truck, a transverse member laterally movable with reference to said truck, and a rolling bearing-support in the form of a sector, of a cylinder with a radius equal to the distance between the rigid and movable parts and having a pivotal bearing upon one of said parts and a rolling bearing on the other, substantially as and for the purpose described.

In testimony whereof we sign this specification in the presence of two witnesses.

HENRY C. HODGES.
CLARENCE B. HODGES.

Witnesses:
R. A. PARKER,
MARION A. REEVE.